April 18, 1967  T. GEORGI  3,314,691
FIFTH WHEEL COUPLING

Filed April 2, 1965  3 Sheets-Sheet 1

Inventor:
Theodor Georgi
By: Spencer & Kaye
Attorneys

Inventor:
Theodor Georgi

3,314,691
FIFTH WHEEL COUPLING

Theodor Georgi, Steinegg-Appenzell, Switzerland, assignor to Jost-Werke G.m.b.H., Frankfurt am Main, Germany
Filed Apr. 2, 1965, Ser. No. 445,092
15 Claims. (Cl. 280—434)

The present invention relates generally to semi-trailer couplings for motor vehicles, and, more particularly, to such couplings with automatic adjustment of the locking effect.

In semi-trailer couplings, automatic adjustment of the coupling is desirable in order to allow for any wear at the king pin and in the coupling components.

One object of the present invention is to provide a semi-trailer coupling which combines effective adjustment for wear with the advantages of one-hand operation and wherein, particularly after manual release of the coupling, no additional operations are required to position the parts for the next coupling operation.

Another object of the invention is to provide a coupling of the character described which is of very simple construction and the operation of which requires just one lever which has to be actuated manually to release the coupling.

A further object of the invention is to provide a coupling which ensures optimum power transmission with minimum wear of the coupling components.

These objects and others ancillary thereto are accomplished in accordance with preferred embodiments of the invention wherein a coupling plate is provided which is slotted to receive a king pin. There is also a locking plate which is rotatably mounted on the coupling plate and asymmetrically disposed in relation to the coupling plate slot. The locking plate is formed with a bearing recess to mate with the king pin and a locking recess which is engaged, in the locking position, by a locking element which is spring biassed so as to turn the locking plate in the direction for engaging the bearing recess with the king pin.

The locking plate may have a large area of contact on each side of the slot in its retainer when it is in the locking position. This ensures optimum power transmission with minimum wear of the coupling components.

The locking element may advantageously be formed by the end of a lever or a link pivotally connected with a lever.

Additional objects and advantages of the present invention will become apparent upon consideration of the following description when taken in conjunction with the accompanying drawings in which.

Figure 1:
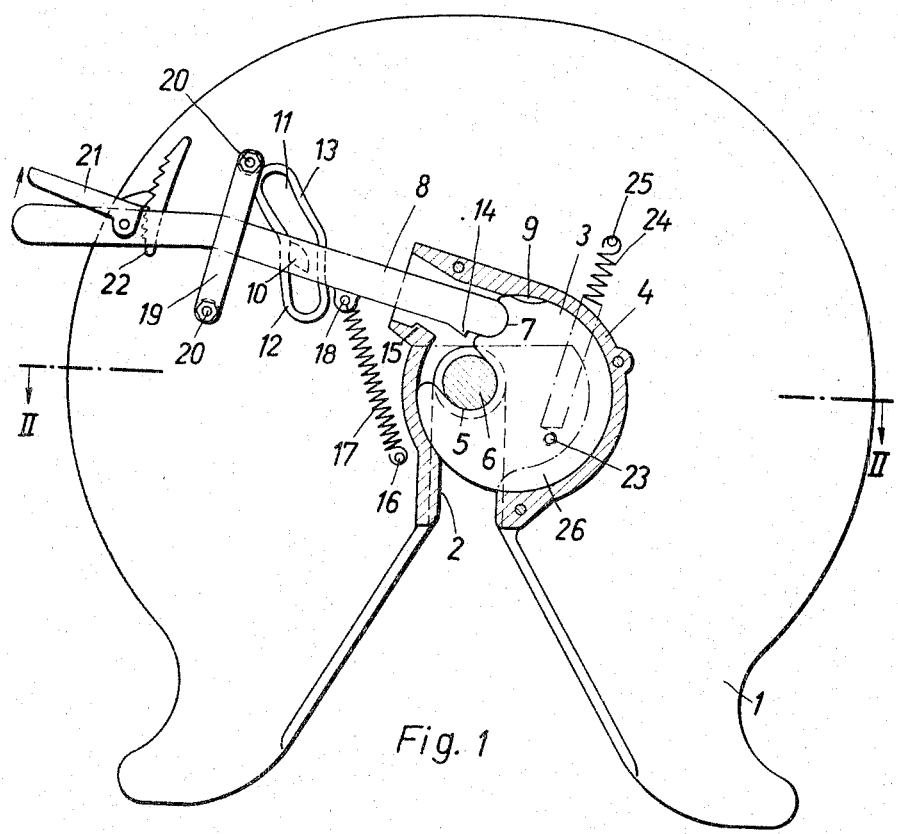
FIGURE 1 is a plan view in partial section, showing a semi-trailer coupling according to the invention in the coupled position.
Figure 2:
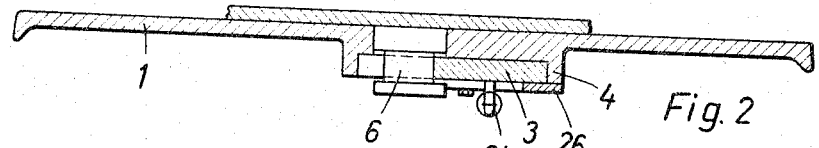
FIGURE 2 is a section on the line II—II in FIGURE 1.
Figure 3:
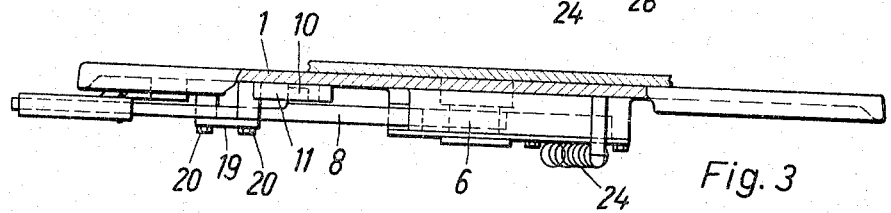
FIGURE 3 is a side elevation of a coupling according to FIGURE 1.

With more particular reference to the drawings, FIGURES 1 to 5 show a semi-trailer coupling wherein a locking plate 3 is rotatably mounted on a coupling plate 1 which is formed with a slot 2. The plate 3 is mounted in a box-like retaining element 4 which extends around and over the plate 3. The plate 3 is formed with a bearing recess 5 matching the periphery of a king pin 6, a recess 7 for engagement by the end of a locking lever 8 and another recess 9 which acts as a driver to prepare for the engaged position.

The locking lever 8 is guided by a projection 10 in a cam guide 11 which has a first curved portion 12 and a second curved portion 13. The lever 8 also has a projection 14 which co-operates with an engagement element 15 on the box-shaped retainer 4. The lever 8 is subject to the action of a helical tension spring 17, which is pivotally connected at 18 with the lever and a fixed point of support 16 on the plate 1. The spring 17 is so connected to the lever 8 in the direction of tension that it tends simultaneously to pull the lever 8 inwardly and pivot it toward the center.

A cross member 19 is also provided to guide the locking lever 8 and is secured to the plate 1 with appropriate spacing by screw connections 20. The lever 8 is also provided with a handle element 21 engaging in locking teeth 22 and biassed by a spring (not shown) to engage with the base of the teeth. Another helical tension spring 24 is pivotally connected between the plate 3 at point 23 and a pin 25 on plate 1. Plate 3 is prevented from dropping out of retaining element 4 by means of a cover plate 26. The remaining details of the coupling are appropriately constructed.

FIGURE 1 shows the coupling in the locked position. The king pin 6 is situated in the recess 5 of the plate 3 and the lever 8 is engaged in recess 7. Since the lever 8 is continually subject to the bias of the spring 17 and the associated wedge effect of the first curved portion 12 of the cam guide 11, any play at the king pin 6 due to wear is balanced by movement of the lever 8 and plate 3. In the coupled and locked state, the plate 3 has a large area of contact with the box-shaped retainer 4 on each side of the slot 2 and thus ensures the above-described advantageous power transmission.

Figure 4:
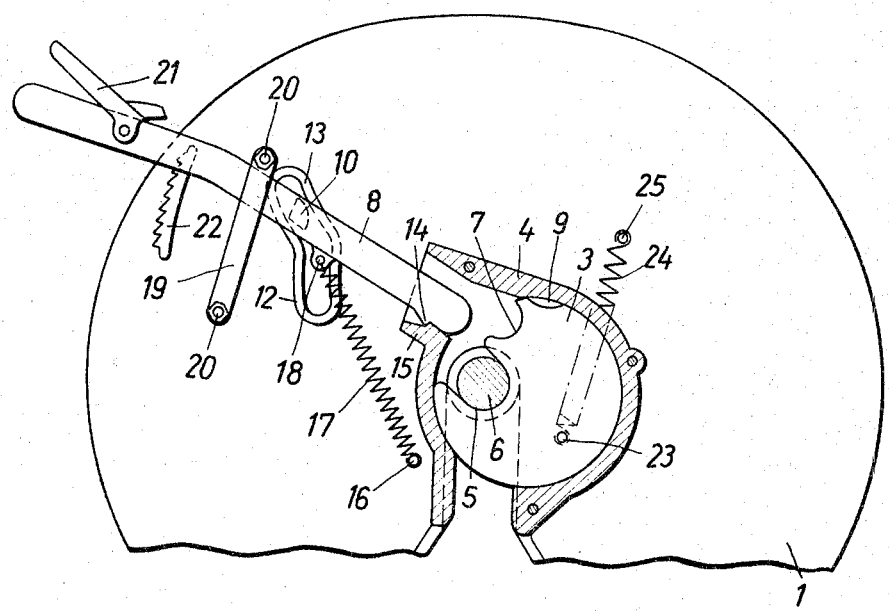
FIGURE 4 is a view similar to FIGURE 1 showing the coupling according to FIGURE 1 at the beginning of the de-coupling operation, with the locking lever engaged.
Figure 5:
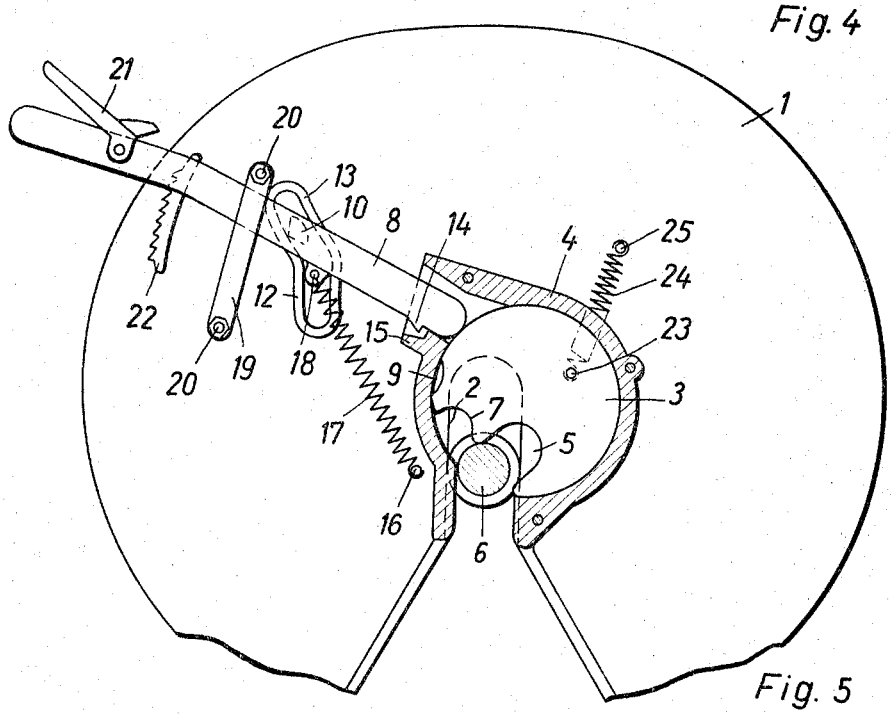
FIGURE 5 is a view similar to FIGURE 1 showing the coupling according to FIGURE 1 with the king pin withdrawn during the de-coupling operation.

In the operative position shown in FIGURE 4, the lever 8 has been manually actuated in the direction of the arrow (see FIGURE 1) to release the coupling. The free end of the lever 8 has been withdrawn from the recess 7 and from the range of rotation of the plate because the guide element 10 now bears against the second portion 13 of the guide 11, and the projection 14 on the lever 8 has now engaged the element 15 which is fixed to the housing. On withdrawal of the king pin 6 (see FIGURE 5) the plate 3 rotates in the counter-clockwise direction and this rotation is assisted by the tension of the second spring 24. The king pin 6 is finally completely disengaged from the slot 2 and the plate 3 remains in the position of readiness shown in FIGURE 5.

When re-coupling, the plate 3 is rotated in the clockwise direction by the engagement of the king pin, and the end of the lever 8 is swung out and disengaged from element 15 because of its lateral mobility in the retainer 4 and its engagement with the recess 9 of the plate 3 as this plate rotates. If the king pin 6 then moves on toward the locking position, the end of the lever 8 which has been disengaged from recess 9 in the plate 3 then moves into the recess 7 in the locking position so that, as already stated, adjustment for wear is possible during operation under the action of the spring 17 by movement of the element 10 in the first portion 12 of the guide 11.

Figure 6:
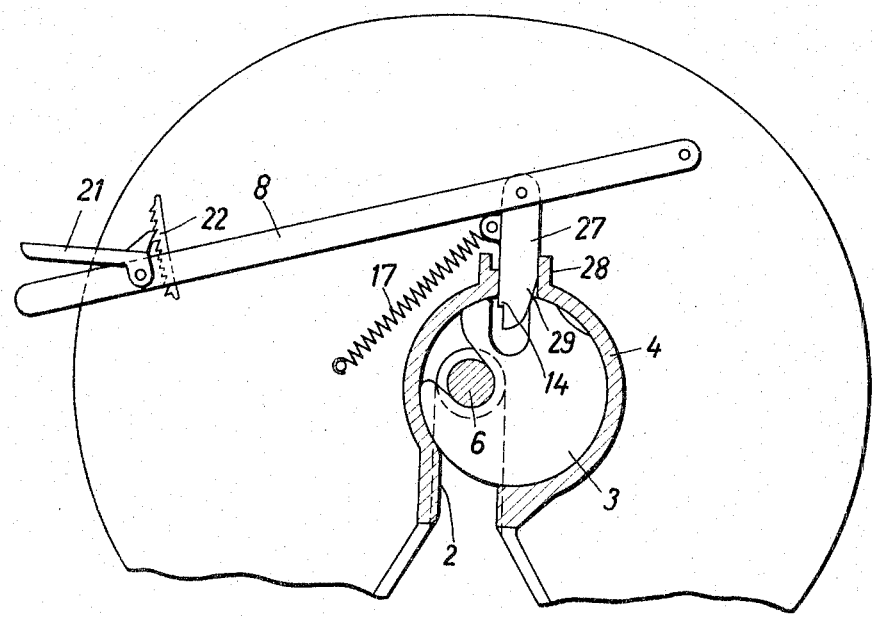
FIGURE 6 is a view similar to that of FIGURE 1 showing a semi-trailer coupling wherein the locking lever engages the locking plate recesses by means of a pivotable link.

In the modified embodiment shown in FIGURE 6, a link 27 is pivotally connected to the locking lever 8 and is also subject to the action of the spring 17.

This link 27 is provided with the engagement projection 14 and carries out the same functions as the engagement end 14 of lever 8 in the embodiment shown in FIGURES 1 to 5. Since lever 8 in this case is in the form of a one-armed lever, it is possible to produce greater forces with reduced operating force. In addition, no separate cam guide is required since the adjustment and withdrawal of the link 27 can take place in a guide 28 of a lateral retainer. To produce the required adjustability of the plate with respect to the guide 28, the link 27 is bevelled at 29 to provide a cam face for engagement with the side of the recess in plate 3.

It can thus be seen that in one form of the invention, the locking element may be formed by the end of a locking lever which has a part which engages a cam guide having two curved portions. These portions are so arranged that a self-locking wedge action occurs in the first portion with respect to the lever part and that when the coupling is manually released, the locking lever is guided by its part engaging the second curved portion which has a slope such that the end of the locking lever is withdrawn from the locking recess.

The locking plate may be mounted on the coupling plate in various ways, for example in a box-like retainer without the use of any pivot. The box-like retainer may be formed with a recess for the introduction of the king pin and another recess for the passage of the locking element. Alternatively, the locking plate may be mounted by means of a pivot, the latter bearing against the coupling plate and against a retaining element connected to the plate.

In one advantageous embodiment the locking element may be provided with an engagement projection by means of which the locking element can resiliently engage an engagement element fixed to the coupling plate so that when the coupling is manually released, the locking element may be simultaneously withdrawn and will become engaged, thus freeing the locking plate for rotation.

Advantageously, the locking element may be laterally pivotable to a limited degree at least after it has been disengaged from the locking recess. With such a construction, the locking plate may advantageously be formed with a further recess arranged after the bearing recess and the locking recess as considered in the clockwise direction, the further recess being relatively shallow and acting as a driver such that when the king pin is introduced, the locking element initially engages the further recess. It is then driven by the rotation of the locking plate until the engagement projection clears the engagement element, thus preparing for the correct sequence during the subsequent locking operation when the locking element engages in its recess in the locking plate. It is important that the position of readiness is obtained automatically by rotation of the locking plate during movement of the king pin in the de-coupling and coupling processes without any further operation being necessary.

It is also advantageous to provide the locking lever with other locking means which can be adjusted by means of a handle and which are formed as ratchet teeth. The operation of the coupling can be advantageously modified, if required, by connecting a resilient tension element to the locking plate, in such a manner that it tends to turn the locking plate into the coupling opening position.

The various parts of the coupling may be constructed in various ways with the same basic principle. For example, the single locking plate may be replaced by two or more such plates above and below the coupling plate.

The locking plate may advantageously be mounted in the box-like retainer with sufficient play for the locking plate to assume an appropriate position if there is irregularity in the mounting of the plate on the king pin.

It will be understood that the above description of the present invention is susceptible to various modifications, changes and adaptations, and the same are intended to be comprehended within the meaning and range of equivalents of the appended claims.

What is claimed is:

1. A semi-trailer coupling for motor vehicles for holding a king pin having a portion of reduced diameter while providing an automatic adjustment of the locking effect, comprising in combination: a coupling plate provided with a cylindrical box-like retainer and a slot for receiving such king pin, which slot terminates in a base in the region of said retainer, which base has a radius of curvature substantially equal to that of the king pin; a locking plate rotatably disposed in said retainer, and supported exclusively by the walls of said retainer, said locking plate being asymmetrically disposed in relation to said coupling plate slot and being formed with a locking recess and with a bearing recess of a size to mate with the reduced diameter portion of such king pin; and a locking element which is spring biased into a locking position in which it engages said locking recess for rotating said locking plate in a direction in which such king pin is engaged in said bearing recess and is tightly clamped between said slot base and said locking plate.

2. A semi-trailer coupling as defined in claim 1, wherein said locking element is the end of a locking lever.

3. A semi-trailer coupling as defined in claim 1, wherein said locking element is a link pivotally mounted on a locking lever.

4. A semi-trailer coupling as defined in claim 1 wherein said locking element is so mounted that, for release of the coupling, the end thereof can be withdrawn from the locking recess against the action of the spring bias and clear of the periphery of the locking plate.

5. A semi-trailer coupling, comprising, in combination:
 (a) a coupling plate which has a slot for receiving a king pin, which slot terminates in a base;
 (b) a locking plate having a bearing recess and a locking recess;
 (c) means mounting said locking plate asymmetrically in relation to the coupling plate slot, and adjacent said slot base, for rotatable movement on said coupling plate so that in a locking position the bearing recess mates with such king pin; and
 (d) a spring biased locking element for engaging said locking recess in the locking position to turn the locking plate in a direction where the bearing recess engages such king pin and causes it to be tightly clamped between said slot base and said locking plate, and arranged to be manually retracted from the locking recess and from the range of rotary movement of the locking plate against the spring bias to release the coupling.

6. A coupling as defined in claim 5 wherein said locking element is a locking lever the end of which engages in said locking recess.

7. A semi-trailer coupling as defined in claim 5 wherein said means includes a box-like retainer in which said locking plate is held and which is formed with a first recess to receive the king pin and a second recess for passage of said locking element.

8. A semi-trailer coupling as defined in claim 5 wherein said means includes a pivot mounting said locking plate on said coupling plate and on a retainer element connected thereto.

9. A semi-trailer coupling as defined in claim 5 wherein said locking element is provided with an engagement projection which engages an engagement element fixed to said coupling plate.

10. A semi-trailer coupling as defined in claim 5 wherein said locking element is arranged to move laterally to a limited degree at least after it has been disengaged from the recess in said locking plate.

11. A coupling as defined in claim 6 wherein said lever is provided with a handle, and further comprising locking teeth on said coupling plate for engagement with said handle.

12. A semi-trailer coupling, comprising, in combination:
 (a) a coupling plate which has a slot for receiving a king pin, said slot terminating in a base;
 (b) a locking plate having a bearing recess and a locking recess;
 (c) means mounting said locking plate asymmetrically in relation to the coupling plate slot, and adjacent said slot base, for rotatable movement on said coupling plate so that in a locking position the bearing recess mates with the king pin, at least around the portion thereof which faces the opening to the coupling plate slot; and (d) a spring biased locking element for engaging said locking recess in the locking position to turn the locking plate in a direction where the bearing recess engages such king pin, and the king pin is tightly clamped between said slot base and said locking plate and arranged to be manually retracted from the locking recess and from the range of rotary movement of the locking plate against the spring bias to release the coupling.

13. A coupling as defined in claim 12 wherein the locking plate has an open position in which the bearing recess is free of engagement with the king pin, and further comprising a resilient tension element connected to the locking plate and tending to turn it into its open position when said locking element has been retracted.

14. A semi-trailer coupling, comprising in combination:
(a) a coupling plate which has a slot for receiving a king pin;
(b) a locking plate having a bearing recess and a locking recess;
(c) means mounting said locking plate asymmetrically in relation to the coupling plate slot and for rotatable movement on said coupling plate so that in a locking position the bearing recess mates with the king pin;
(d) a spring biased locking element constituted by a locking lever the end of which engages in said locking recess in the locking position to turn the locking plate in a direction where the bearing recess engages such king pin and arranged to be manually retracted from the locking recess and from the range of rotary movement of the locking plate against the spring bias to release the coupling; and
(e) a cam guide on said coupling plate, said lever having a follower disposed to be controlled by said guide, said cam guide having a first curved portion which causes a self-locking wedge action with respect to the locking lever follower, and a second curved portion which has such a slope that when the coupling is manually released the locking lever is guided by the follower and the end of the locking lever is withdrawn from the recess.

15. A semi-trailer coupling, comprising in combination:
(a) a coupling plate having an engagement element fixed thereto and a slot for receiving a king pin;
(b) a locking plate having a bearing recess and a locking recess;
(c) means mounting said locking plate asymmetrically in relation to the coupling plate slot and for rotatable movement on said coupling plate so that in a locking position the bearing recess mates with the king pin; and
(d) a spring biased locking element for engaging said locking recess in the locking position to turn the locking plate in a direction where the bearing recess engages such king pin and arranged to be manually retracted from the locking recess and from the range of rotary movement of the locking plate against the spring bias to release the coupling, said locking element being provided with an engagement projection which engages said engagement element;
(e) said locking plate having a further recess arranged after the bearing recess and the locking recess, and said locking element being so mounted as to be laterally movable to such an extent that when the king pin is introduced said locking element first engages the further recess and is then moved by the rotary movement of said locking plate until said engagement projection has cleared said engagement element, thus freeing said locking element for its subsequent engagement in the locking recess of said locking plate.

References Cited by the Examiner
UNITED STATES PATENTS

| | | | |
|---|---|---|---|
| 1,958,723 | 5/1934 | Spencer | 280—438 |
| 1,991,507 | 2/1935 | Ketel | 280—434 |
| 2,072,661 | 3/1937 | Walther | 280—434 |
| 2,140,990 | 12/1938 | Emrick | 280—434 |
| 2,885,222 | 5/1959 | Walther | 280—436 |
| 3,181,480 | 5/1965 | Sherrie et al. | |

LEO FRIAGLIA, *Primary Examiner.*